(12) United States Patent
Agarwal et al.

(10) Patent No.: US 11,900,675 B2
(45) Date of Patent: Feb. 13, 2024

(54) DYNAMIC IMAGE ANALYSIS AND CROPPING

(71) Applicant: Apple Inc., Cupertino, CA (US)

(72) Inventors: Ashish Agarwal, Sunnyvale, CA (US); Fei Peng, San Jose, CA (US); Wenyu Zhang, San Jose, CA (US); Matthew H. Thorn, Seattle, WA (US); Sean Michael Harold, San Jose, CA (US); Douglas Isaac Friedman, San Francisco, CA (US); Leticia Marie Alarcón, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/946,720

(22) Filed: Sep. 16, 2022

(65) Prior Publication Data

US 2023/0020233 A1    Jan. 19, 2023

Related U.S. Application Data

(63) Continuation of application No. 16/421,146, filed on May 23, 2019, now Pat. No. 11,462,009.

(60) Provisional application No. 62/679,569, filed on Jun. 1, 2018.

(51) Int. Cl.
*G06V 20/20* (2022.01)
*G06T 7/11* (2017.01)
*G06V 40/16* (2022.01)

(52) U.S. Cl.
CPC .............. *G06V 20/20* (2022.01); *G06T 7/11* (2017.01); *G06V 40/171* (2022.01); *G06V 40/172* (2022.01); *G06T 2207/20132* (2013.01); *G06T 2207/30201* (2013.01)

(58) Field of Classification Search
CPC .................. G06V 20/20; G06V 40/171; G06T 2207/30201; G06T 2207/20132; G06T 7/11; G06T 7/12
See application file for complete search history.

(56) References Cited

U.S. PATENT DOCUMENTS

| | | | |
|---|---|---|---|
| 7,451,405 B2 | 11/2008 | Sylthe et al. | |
| 9,329,827 B2 | 5/2016 | Lavine et al. | |
| 9,507,757 B2 | 11/2016 | Matas et al. | |
| 2002/0081003 A1 | 6/2002 | Sobol | |
| 2010/0295920 A1 | 11/2010 | McGowan | |
| 2011/0096228 A1 | 4/2011 | Deigmoeller et al. | |
| 2013/0069980 A1 | 3/2013 | Hartshorne et al. | |
| 2013/0147845 A1 | 6/2013 | Xie et al. | |
| 2014/0176612 A1 | 6/2014 | Tamura et al. | |
| 2015/0040000 A1* | 2/2015 | Rice ...................... | G06F 40/143 715/235 |
| 2015/0228067 A1 | 8/2015 | Downing et al. | |

* cited by examiner

*Primary Examiner* — Margaret G Mastrodonato
(74) *Attorney, Agent, or Firm* — FLETCHER YODER PC

(57) ABSTRACT

The disclosed techniques generally relate to devices and methods for generating cropped images in which one or more features of interest are preserved or emphasized. In one implementation, such features of interest may include facial features. In accordance with certain implementations, location and extent of such features may be identified and used in conjunction with information regarding display characteristics so as to generate cropped images preserving or emphasizing the feature of interest when displayed on a given device.

20 Claims, 7 Drawing Sheets

DYNAMIC IMAGE ANALYSIS AND CROPPING

CROSS-REFERENCE TO RELATED APPLICATIONS

This application is a continuation of U.S. Non-Provisional application Ser. No. 16/421,146, entitled "Dynamic Image Analysis and Cropping," filed on May 23, 2019, which claims the benefit of U.S. Provisional Application No. 62/679,569, entitled "Dynamic Image Analysis and Cropping," filed on Jun. 1, 2018, each of which is incorporated herein by reference in its entirety for all purposes.

BACKGROUND

The present disclosure relates generally to displaying an image having one or more features of interest, such as facial features, on electronic devices having displays of different sizes and shapes.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As the prevalence of electronic devices has increased, the use of such devices to access digital media has also increased. By way of example, digital media for display on a device may include or may be associated with an artistically or professionally composed image, such as an album cover, book cover, advertisement, and so forth. However, the disparity in the size and/or shape of displays on electronic devices may lead to irregularities or inconsistencies in the display of such images, which may result in such images not being seen as intended by a viewer.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present approach relate to determining a suitable shape or size of an image for display on a particular device (which may be conveyed by a device crop code as used herein) and cropping a respective image based on this information so that the image is suitable for display on such a device while preserving or emphasizing one or more features of interest, such as a face. In some embodiments, an image analysis application programming interface (API) may be employed that incorporates or implements computer vision algorithms, such as those associated with Vision framework, available from APPLE® Inc., that facilitate one or more of face and face landmark detection, text detection, object or object landmark detection and so forth. As discussed herein, aspects of such API implementations of computer vision may be employed to define multiple cropping and shifting parameters based upon received display dimensions of a user device and facial features of an image to be displayed on the device.

By way of example, in a music context, the image to be displayed may be an album cover or other image associated with the music or artist, where the image is displayed on the device in a web browser, storefront, or media player application. In one example, an application that may display such images is ITUNES®, available from APPLE® Inc., where an associated artistic image may be cover art associated with the artist or with an album. More generally, as used herein an image to be displayed may include art or images associated with books, movies, or other prepared or commercial images (including stock photos, news photos, and so forth) that are intended to be displayed so as to maintain, preserve, or emphasize certain content within the images, such as faces. Accordingly, the images discussed herein may be analyzed to detect facial features and may be cropped and positioned to complement the display shape and size of a user's device.

In some embodiments, the analysis of an image for display on different devices may include detecting facial features present in an image via a facial recognition algorithm that detects a combination of facial features, proximity of detected faces within the image, and so forth and in some instances may allow individual (i.e., known) faces to be detected, such as based on known facial parameters for a face of interest. The region in the image corresponding to the face(s) may be cropped in accordance with known dimensions for a display of a device, which may be ascertained using a device-based cropping code for the respective device.

To facilitate cropping for different shapes and sizes of displays, a cropping algorithm or algorithms, may account for different boundaries or regions associated with one or more identified faces so as to preserve or emphasize the faces in the cropped image. For example, a given image may include boundaries for the detected facial features, boundaries for the head or head region around the identified face(s), such as including a hair line around the face, a further boundary including some or all of the faces detected in the image (e.g., a grouping boundary), and so forth. In some aspects, the device-based crop code(s) may also specify or otherwise allow for a padding region or border to the defined borders, such as to prevent a face or head from being flush to the edge of a display screen when viewed. Such padding may be specified in absolute terms (e.g., a defined distance) or in a relative sense. Similarly, the cropping process may take into account the placement of faces identified in the image, such as to center the faces within the cropped image(s) or to otherwise shift the image so as to place the faces in a manner to preserve the composition or artistic impression created by the original image.

Further, in other embodiments, the feature of interest that is identified to inform the cropping process may be non-facial features, such as objects or labels. The image analysis algorithm in such an embodiment may be configured to detect the object or label and crop the image based on the locations of the identified objects in the image and on the crop code for a respective device.

In other embodiments, the feature of interest may be a specific or known face, such as a celebrity face (e.g., an actor, athlete, singer, politician, and so forth). In such an embodiment, the image analysis algorithm may be configured to detect the specific face (e.g., a famous face) based on known facial parameters for the celebrity face and may prioritize placement of the celebrity face in the cropped image, such as to ensure visibility or prioritize placement of the celebrity face. Thus, in this embodiment, a celebrity face may be detected by comparison of the detected facial parameters to known parameters for that celebrity and the respective image cropped so as to ensure visibility of the celebrity face when the cropped image is displayed on a respective device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
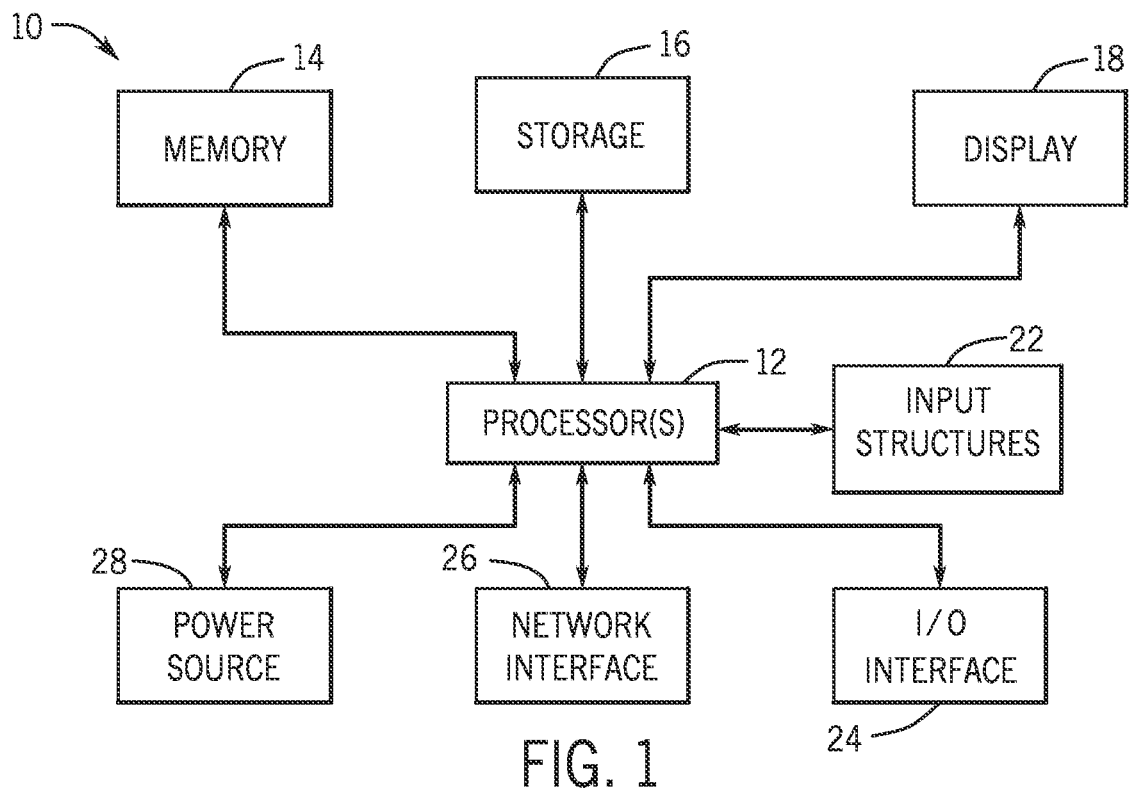
FIG. 1 is a block diagram of components of an electronic device that may implement or employ an computer vision API, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As discussed above, images (e.g., commercial images or artistic images) may be associated with various types of digital media, such as album covers for digital music, book covers, news photos, stock photos, movie posters, and so forth. Such images may be composed so as to depict particular individuals, to create an artistic impression, to convey a message or theme, and so forth. With this in mind, such images may be sized in various dimensions and shapes, and may include one or more faces relevant to the associated media, such as artists, actors, singers, musicians, athletes, politicians, and so forth. As may be appreciated, however, the displays on which such images may be shown may vary widely, in size, aspect ratio, shape, cutout regions and irregularities (e.g., non-linear edges of a display formed to accommodate non-display area "notches" or other features of the electronic device) and so forth. As a result, a carefully composed image prepared for display with other digital content (or on its own) may be displayed on a given device in a non-optimal manner, e.g., cropping the image through a face of a person represented in the displayed image, poorly centering or placing the image in the display with respect to the featured person, and so forth. Such issues may be problematic to the extent that displaying the faces of the individuals represented in the image may be of particular importance to maintain the intended composition or artistic effect of the image.

As discussed herein, images (e.g., artistic images, commercial images, etc.) may be cropped to accommodate display configurations of various known devices such that when a given image is requested by a device of known type, a cropped image is provided that is appropriate for display on that device and that preserves or emphasizes the faces within the image. In one embodiment, the cropped image provided for display on the device may be cropped so as to display one or more faces more prominently than would occur if the uncropped image were provided.

It should be noted that although examples provided herein may be presented generally in a music store or digital content player context (e.g., album covers and so forth), the approaches disclosed may be used in other contexts where an image, such as may be provided by a third party, is to be displayed on various different types of devices having differently sized and shaped displays. Thus, the present examples should be understood to merely reflect a real-world example of a digital content player in order to provide useful context for the discussion, and should not be viewed as limiting the applicability of the present approach. Instead, the present approach should be understood as being applicable to any situation in which images, including third-party or other provided images (such as commercial images, news images, stock photos, and so forth) containing faces are to be displayed on various different types of devices.

With the preceding in mind, and by way of background, a general description of electronic devices that may display a remotely provided, cropped image during use will be provided below. Turning first to FIG. 1, a generalized electronic device 10 suitable for implementing aspects of the present approach may include, among other things, one or more processor(s) 12, memory 14, nonvolatile storage 16, a display 18, input structures 22, an input/output (I/O) interface 24, a network interface 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
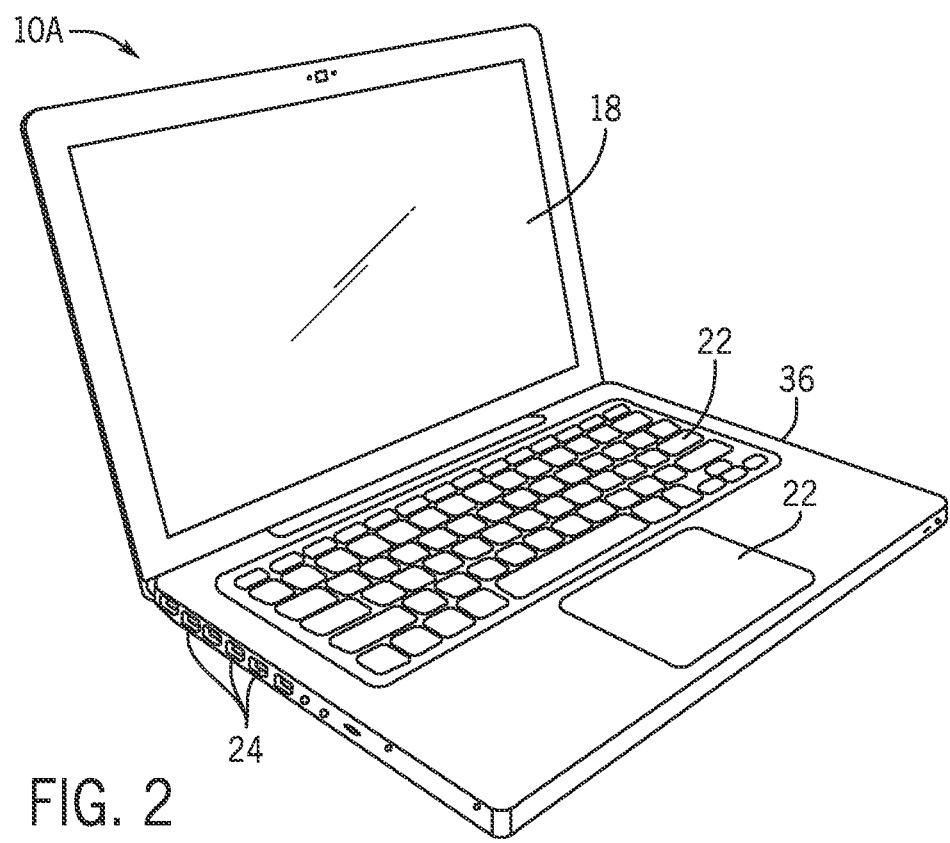
FIG. 2 is a perspective view of a notebook computer representing an embodiment of the electronic device of FIG. 1, in accordance with an embodiment.
Figure 4:
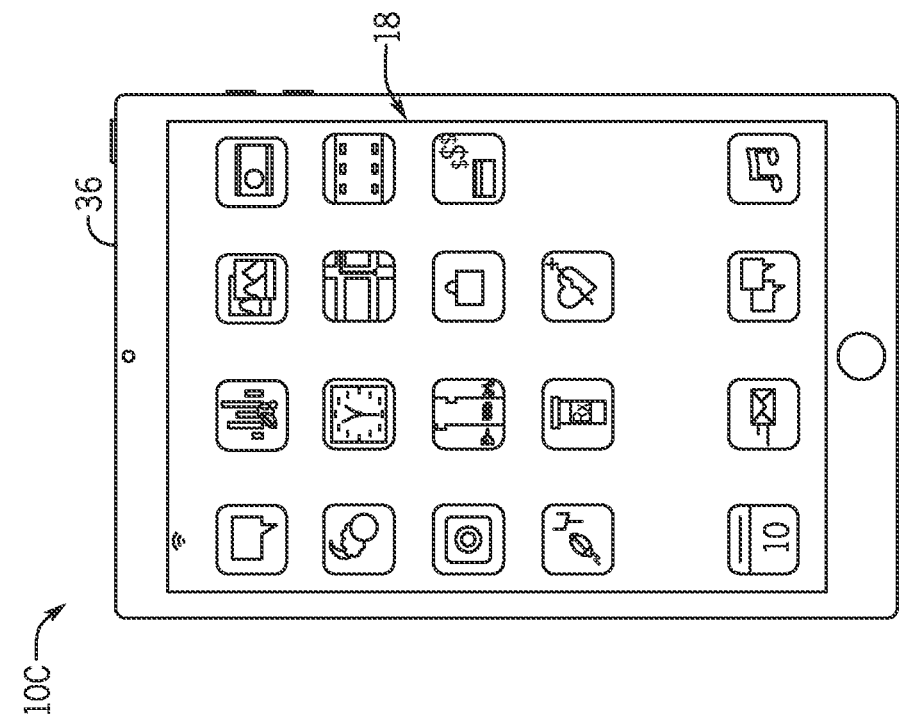
FIG. 4 is a front view of another hand-held device representing another embodiment of the electronic device of FIG. 1, in accordance with an embodiment.
Figure 3:
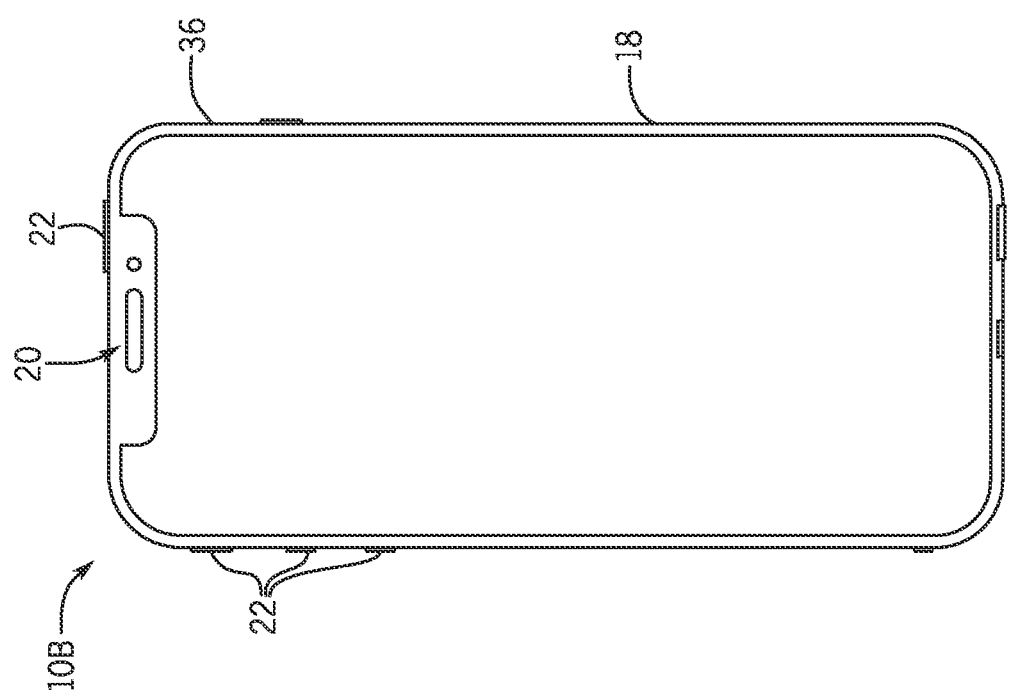
FIG. 3 is a front view of a hand-held device representing another embodiment of the electronic device of FIG. 1, in accordance with an embodiment.
Figure 5:
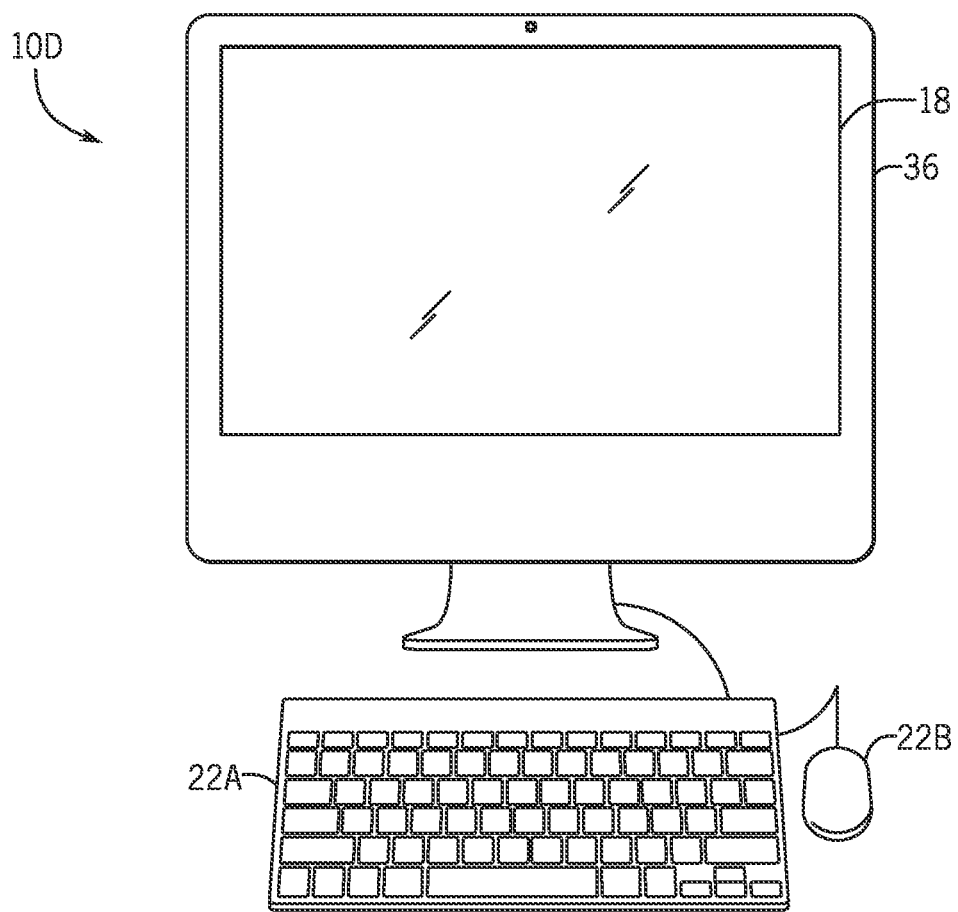
FIG. 5 is a front view of a desktop computer representing another embodiment of the electronic device of FIG. 1, in accordance with an embodiment.
Figure 6:
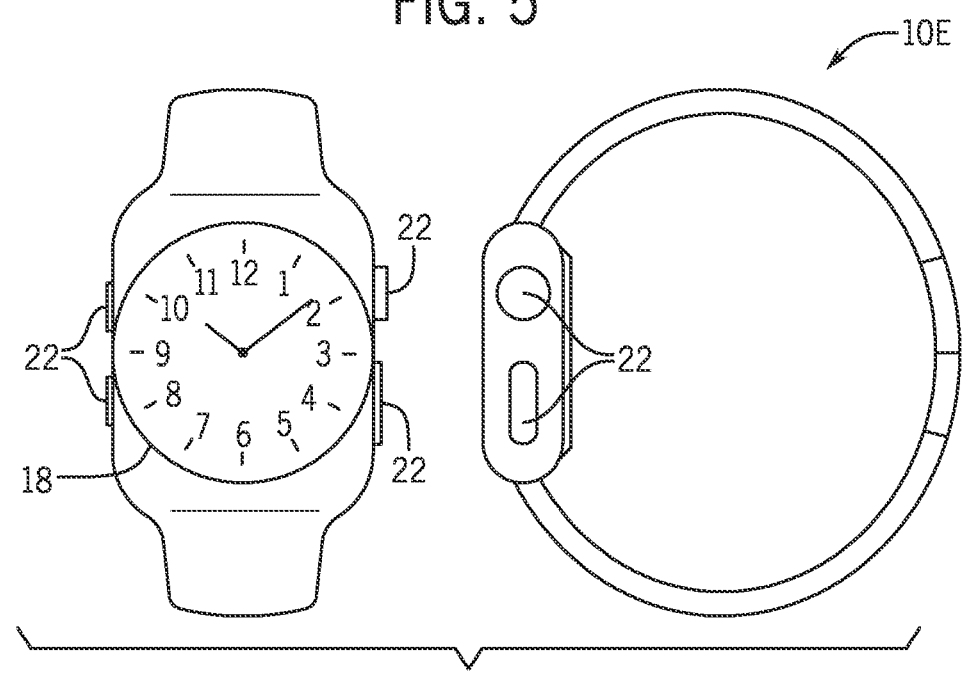
FIG. 6 is a front view and side view of a wearable electronic device representing another embodiment of the electronic device of FIG. 1, in accordance with an embodiment.

By way of example, the electronic device 10 of FIG. 1 may be embodied in practice as a notebook computer, as depicted in FIG. 2, a handheld device (e.g., cellular telephone) as depicted in FIG. 3, a handheld device (e.g., a tablet computer) as depicted in FIG. 4, a desktop computer as depicted in FIG. 5, a wearable electronic device (e.g., a watch) as depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to facilitate the use of the processor(s) 12 to implement various stored algorithms and to analyze, process, or display images received or acquired by the electronic device 10. As discussed herein, the algorithms may include algorithms for one or more of generating cropped images for display on particular devices, transmission of such cropped images, or display of such a cropped image on a respective device. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

The input structures 22 of the electronic device 10 may enable a user to interact with the electronic device 10 (e.g., selectable touch screen features to navigate through a digital content player to different songs on an artist page). The I/O interface 24 may enable electronic device 10 to interface with various other electronic devices, as may the network interface 26.

The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, 4th generation (4G) cellular network, long term evolution (LTE) cellular network, or long term evolution license assisted access (LTE-LAA) cellular network. Network interface 26, such as the one described above, may allow a digital content player to stream music (or other content) over a network and, during such an operation, may display an artist page with a corresponding cropped image as described herein. Similarly, other digital content (e.g., news, e-books, videos, and so forth) may be similarly accessed over a network to be made available on the electronic device 10 and may be presented in conjunction with a cropped image relevant to the content, as discussed herein.

As further illustrated, the electronic device 10 may include a power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device, each with different display shapes, sizes, and respective aspect ratios. Such computers may include computers that are generally portable (such as a laptop, notebook, and tablet computers) as well as computers that are generally used in one place (such as conventional desktop computers, workstations, and/or servers). By way of example, the electronic device 10, taking the form of a notebook computer 10A, is illustrated in FIG. 2. The depicted notebook computer 10A may include a housing or enclosure 36, a display 18, input structures 22, and ports of an I/O interface 24. In one embodiment, the input structures 22 (such as a keyboard and/or touchpad) may be used to interact with the notebook computer 10A, such as to start, control, or operate a GUI or applications running on notebook computer 10A. For example, a keyboard and/or touchpad may allow a user to navigate a user interface or application interface, such as an interface of a digital content player application, and view an associated image for an artist page displayed on display 18. The image may change as the user navigates through different songs on the digital content player.

FIG. 3 depicts a front view of a handheld device 10B, which represents one embodiment of the electronic device 10. The handheld device 10B may represent, for example, a cellular telephone, a media player, a personal data organizer, a handheld game platform, or any combination of such devices. An enclosure 36 may surround or support a display 18 of the handheld device 10B. The display 18 may be an edge-to-edge display of the entire front of handheld device 10B. In the depicted example, the display 18 is depicted as including a "notch" 20 (i.e., a non-display region) which may be present to accommodate the interior electronics of the handheld device 10B. As may be appreciated, such non-display regions may be present in displays of any of the devices 10 discussed herein as a tradeoff between form factor and circuit constraints. With this in mind, devices having displays with such notches 20 or other non-display regions may benefit from the present approach because such features may be addressed in the cropping information associated with the respective device (i.e., associated with the respective device-based crop codes as discussed herein). Correspondingly, such non-display regions may be accommodated in a cropped image prepared for such a device. Thus the display 18 may be an atypical shape or dimension for a display and an image may be modified to fit the display region accordingly.

User input structures 22, which may be integrated with the display 18, may allow a user to control the handheld device 10B. For example, the input structures 22 may activate or deactivate the handheld device 10B, navigate a user interface to a home screen, navigate a user-configurable application screen, or activate a voice-recognition feature of the handheld device 10B. The input structures 22 may be used to interact with the handheld device 10B, such as to control or navigate a user interface of an application, such as the digital content player. In addition to physical structures, the input structures 22 may include features built into the display 18 so that the display 18 is a touch screen, allowing a user to interact with the display 18 as an input structure 22. In one example, such input structures may be used to invoke or navigate an application that displays cropped images in accordance with the present application.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10. The handheld device 10C may also include an enclosure 36 that holds the electronic display 18, which may be a touch screen display, as described above, that may be used to interact with applications that display cropped images as described herein.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. As in preceding examples, an enclosure 36 may be provided to protect and enclose internal components of the computer 10D such as the display 18, which may be used to display cropped images as discussed herein. In certain embodiments, a user of the computer 10D may interact with the computer 10D using various peripheral input devices, such as the keyboard 22A or mouse 22B (e.g., input structures 22), which may connect to the computer 10D. The peripheral devices may be used to navigate an application that displays cropped images in accordance with the present approach.

Similarly, FIG. 6 depicts a wearable electronic device 10E representing another embodiment of the electronic device 10 of FIG. 1 that may be configured to operate using the techniques described herein. By way of example, the wearable electronic device 10E may be configured as a watch or fitness tracker that may be capable of running applications, including applications capable of displaying remotely provided images cropped so as to accommodate the screen of the wearable electronic device 10E. As in preceding examples, the display 18 of the wearable electronic device 10E may include a touch screen display 18 as well as input structures 22, which may allow users to interact with a user interface of the wearable electronic device 10E. In the depicted example, the display is shown as circular shape, and thus may be an atypical shape for an image that is originally in a rectangular or square format. The input structure 22 may allow a user to navigate through applications executing on the wearable electronic device 10E and the display 18 may present an image cropped to accommodate the display 18 of the device.

Electronic devices 10A, 10B, 10C, 10D, 10E, described above may be used to execute applications (e.g., digital content players, storefronts, web browsers, and so forth) that display cropped images provided from a remote source. As noted above, such images may be remotely cropped in a device-specific manner so as to preserve or emphasize certain features (e.g., faces) when viewed on a display of the respective device. In this manner, an image (e.g., a composed image, such as a commercial image, news image, stock photo, and so forth) may be displayed on a device so as to maintain the original or intended compositions with respect to the depiction and placement of faces with respect to a given display configuration. As discussed in greater detail below, the creation of the cropped images is not done on the device where it is to be displayed (i.e., the display device), but instead occurs on a remote system that serves the cropped image to the display device based on the display device's crop code when the image is requested by an application. Thus, the cropping process is transparent to the display device, which instead merely displays the image it receives from the remote source in response to a request.

As discussed herein, in certain implementations, the cropping of images may be performed algorithmically based in part on "crop codes" that are specific to the display devices to be supported, and which convey or link to information (e.g., resolution, size, shape, non-display regions, and so forth) about the display of a corresponding device. For example, a given crop code may allow relevant display information to be accessed in a look-up table and subsequently used for image cropping.

In addition, the algorithmic cropping of the images may also be based at least in part based on one or more faces identified in a given image. As discussed herein, such a face or faces may be associated with different levels or types of boundary boxes (e.g., face only, head only, multiple faces, and so forth) so that based on the different boundary boxes and a given device crop code, a cropped image may be generated for display on a given device that emphasizes or preserves the faces present in the image. In some implementations, an absolute or relative padding term may also be provided so that, to the extent possible, an image is not cropped in such a way as to places a face or faces against an edge of the display.

Figure 7:
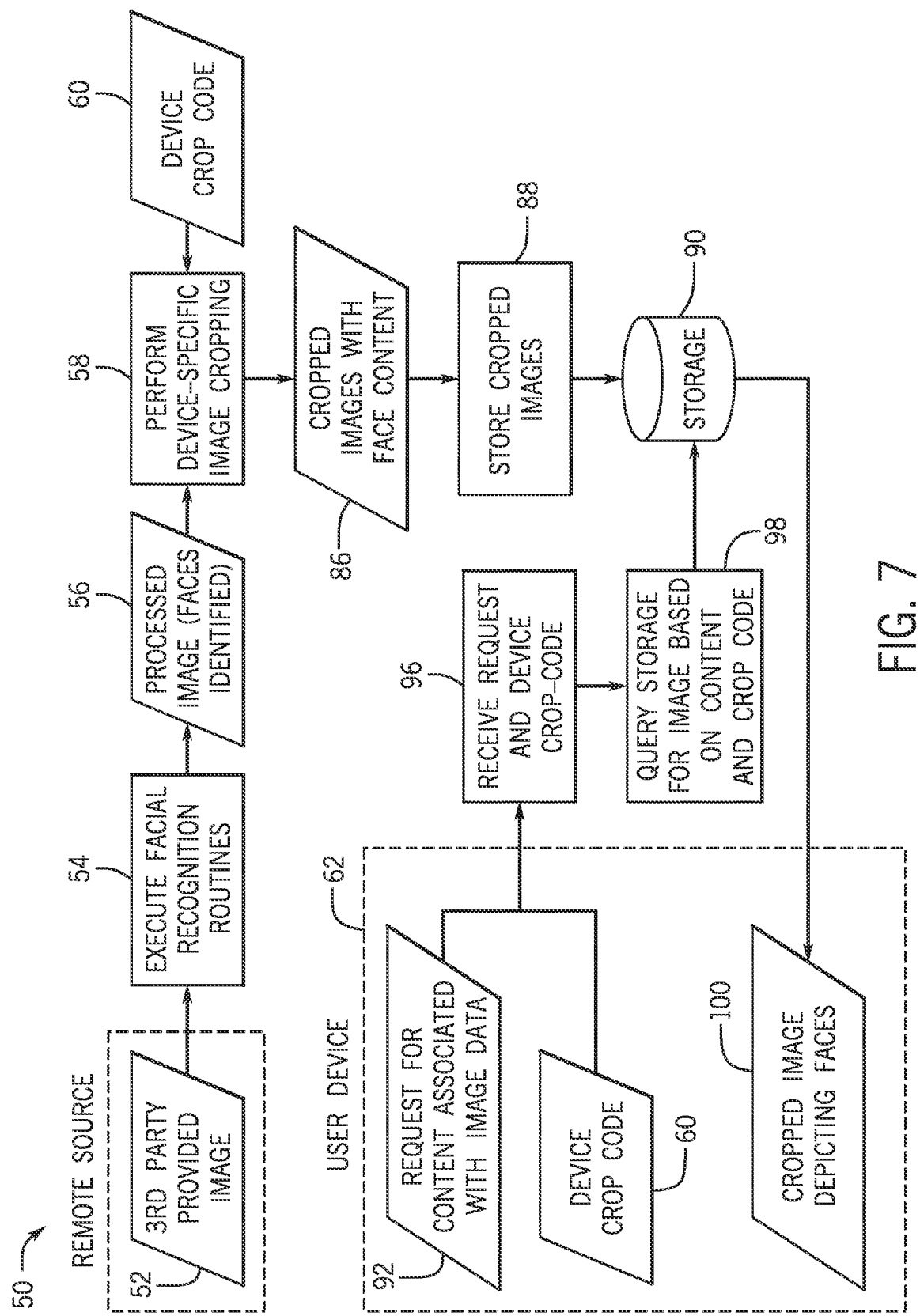
FIG. 7 is a flow diagram illustrating steps implementing generation and distribution of cropped images, in accordance with an embodiment.

With the preceding general introduction in mind, flow diagram 50 in FIG. 7 illustrates a facial detection and image cropping process as well as a related process for distributing the cropped images based on the display characteristics of a user device 62. As shown, the facial detection and crop portion of the process may include the steps corresponding to process blocks 54, 58, and 88. In this example, the process of creating or generating cropped images may involve receiving or acquiring an image from a remote source, such as an image 52 provided by a third-party (i.e., not the user device 62 on which the cropped image will be displayed nor the entity performing the cropping). By way of example, such an image 52 may be provided by an entity (e.g., a content-provider) that provides related digital content (e.g., music, news feeds, e-books, movies, and so forth). Thus the image 52 may be composed as a commercial or artistic image for the purpose of displaying with the associated content and may be provided to an entity that distributes the digital content to a multitude of connected user devices 62. In the depicted example, the image 52 includes one or more faces, such as faces of the artists associated with the related digital content, a book cover, a news or stock photo for display with an article, and so forth.

In the depicted example, a machine-executable algorithm processes the image 52 to generate a plurality of differently cropped images 86, such as a differently cropped image for each supported device crop code 60. By way of example, the routine may employ or implement a computer vision application programming interface (API), such as may be associated with the Vision framework available from APPLE® Inc. The computer vision API may be used, in this example, to execute one or more facial recognition routines (block 54) that may detect faces in the image 52 by detecting and mathematically parameterizing facial features within the image 52. Alternatively, in other embodiments, the recognition algorithm may instead detect other features of interest, such as labels or objects, which may be processed in place of facial features in other implementations. That is, though facial recognition is discussed by way of example herein, the recognition routines may instead, or in addition to, recognize other image features (e.g., vehicles, animals, food items, and so forth) to preserve or emphasize in cropped images in accordance with the present approach.

In the present example, the computer vision API may detect faces by capturing or receiving the image from the remote source (e.g., a content provider) and determine the location and associated parameters of recognized faces, which may be detected based on a confidence or likelihood score of a facial image detection calculation. The facial image detection may consider multiple facial features as a whole to determine that a face has accurately been detected. The features considered may be points of interest and their intersection (e.g., two eyes aligned along a horizontal line in close proximity to a nose along a vertical line, detected at or near a point between each eye). In this example, an output of the facial recognition process block 54 may be a processed image 56 in which faces or facial features are identified and located at one or more levels of detail, as discussed herein.

In the process shown in FIG. 7, the processed image 56 containing the facial recognition annotations may be further processed to generate a plurality of cropped images 86 with facial content preserved or emphasized for display on different types of user devices 62. In particular, in this example a different cropped image 86 may be generated for each device crop code 60 by performing device-specific image cropping (block 58), where each device crop code 60 links to or otherwise conveys information about the display parameters of a device or devices associated with the respective device crop code 60. For example, device crop codes 60 may correspond to entries in a look up table conveying resolution, shape, size, irregularities (e.g., notches), and so forth for each type of supported display device. Further, to the extent a given user device 62 may have multiple display modes (e.g., portrait, landscape, etc.), each display mode of the user device 62 may have a corresponding device crop code 60.

These factors come together at process block 58 to perform device-specific image cropping (based on the device crop codes 60) on each processed image 56 to generate a plurality of cropped images 86 (e.g., one for each device crop code 60). In the depicted example, this plurality of cropped images 86 may be stored (block 88) in a device or network accessible storage 90, where they may subsequently be served to user devices 62 as needed.

While the preceding depicts an example of how cropped images 86 may be generated prior to being requested for subsequent device-specific distribution, it should also be appreciated that the process described in FIG. 7, may be modified or otherwise implemented in a more dynamic manner, such as by not generating the cropped image 86 for a given device crop code 60 until requested by a respective user device 62. Once generated, however, such a respective cropped image 86 may be stored or cached so as not to have to be recreated when subsequently requested by a device having the same device crop code 60.

Figure 8:
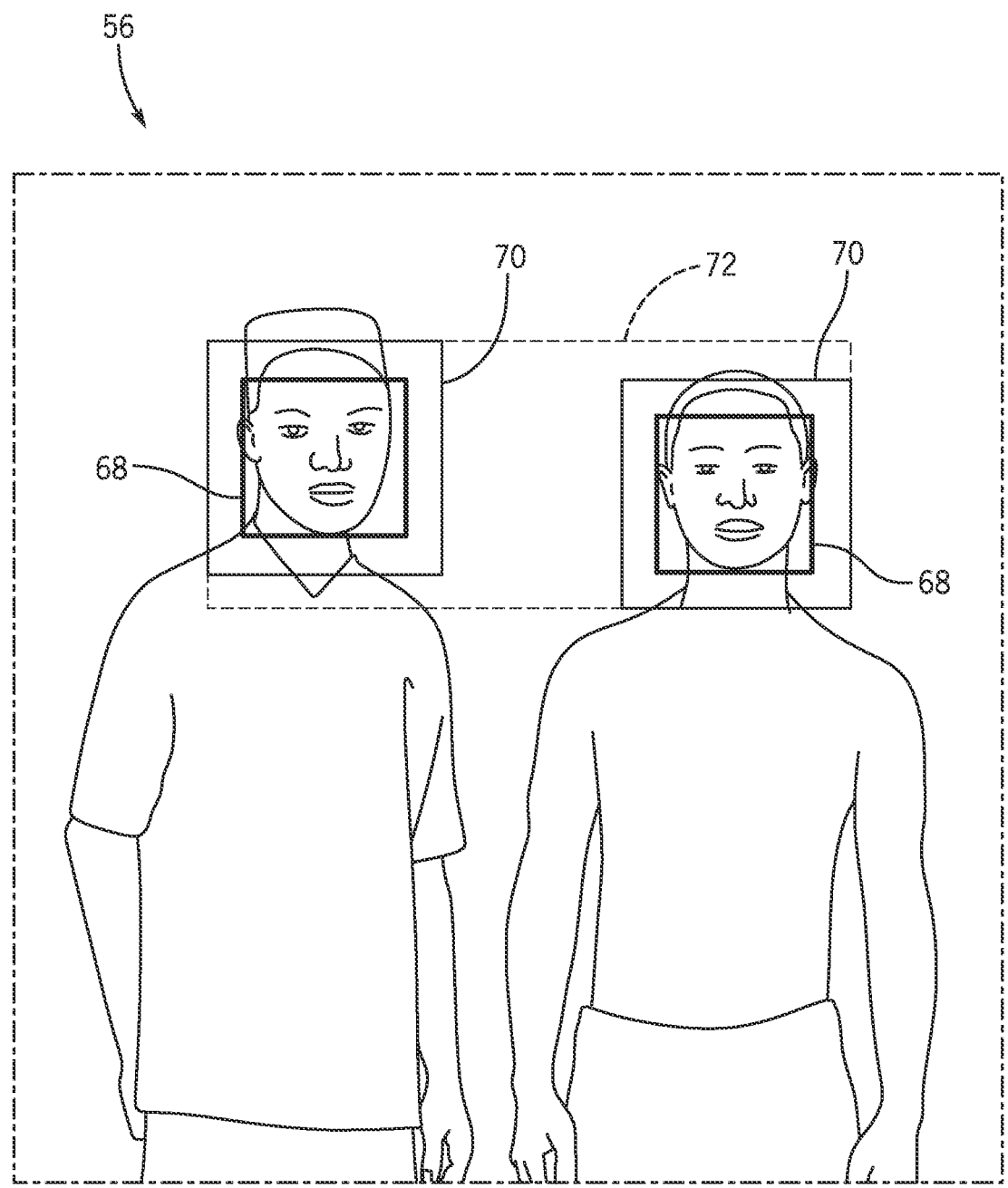
FIG. 8 is an example of an image in which faces are recognized and different levels of boundaries encompassing the faces are displayed, in accordance with an embodiment.

As discussed herein, the cropping algorithms employed at process block 58 may include multiple steps and may take into account multiple boundaries associated with recognized facial features to implement the proper cropping and shifting used to generate a respective cropped image 86 for a given user device crop code 60. To illustrate the use of multiple facial recognition boundaries corresponding to different levels of specificity, FIG. 8 depicts a processed image 56 in which different levels or degrees of facial detail are denoted by boundary boxes. In this example, a first boundary box 68 may be provided that encompasses the detected facial features within the processed image 56. For example, a respective first boundary box 68 may correspond to essential facial features, such as two eyes, a nose, and a mouth.

In the depicted example, a second boundary box 70 may encompass the first boundary box 68 and further include additional features, such as including part of a hairline of a facial image or, more generally, the head of the person. Thus, second boundary box 70 (encompassing the respective first boundary box 68) may be implemented on the processed image 56 to encompass some region beyond the limited, detected facial features (here the full face or head). In practice the second boundary box 70 may be placed or set based upon other detected features such as an edge line corresponding to an air-body interface in the image, a detected hairline or chin line, or by padding the corresponding first boundary box 68 by a fixed or relative amount (e.g., 200 pixels, 10% length or width, and so forth).

In addition, in many instances there may be more than one face in an image, and thus, cropping to include the multiple identified faces of a group may be desirable. Thus, in the depicted example a third boundary box 72 may be provided as part of the processed image 56 to indicate the bounds of multiple faces found in the image. As may be appreciated, the third boundary box 72, by encompassing multiple identified faces, may allow a group of faces to be retained or emphasized in subsequent cropped images 86 created using the facially recognition processed image 56. Although only three boundary boxes are discussed above as examples, it may be appreciated that other boundary boxes covering other facial or body extents or other grouping configurations may also be provided. Therefore, the presently described example should be understood to be merely illustrative, and not limiting in the context of the present approach.

Turning back to FIG. 7, the depicted process example further illustrates the subsequent process of a user device 62 requesting and receiving a cropped image 86 suitable for display on the user device 62. As shown, the retrieval of a cropped image 86 may include the steps associated with process blocks 88, 96, and 98. As may be appreciated, the transmission aspect of providing a cropped image to a user device 62 may involve accessing (such as over the Internet) the stored cropped images 86 from storage 90, e.g., a cache, a database, or other logical or physical storage construct. The stored cropped images 86 may be indexed or otherwise searchable based on one or more of an associated digital content (e.g., artist, album, movie, book, etc.), an image name, a device crop code 60, and so forth, such that a cropped image 86 corresponding to a requested content and formatted for display on a given user device 62 may be determined.

In the depicted example of FIG. 7, aspects of this process can be seen with respect to the user device 62. In this example, an application executing on the user device requests 92 online content (e.g., a news story, song, book, etc.) for which there is an associated image. In conjunction with this request, the device crop code 60 associated with the user device 62 or with the user device 62 in a current display mode (e.g., portrait or landscape) is also transmitted. In this example, the request 92 for content having an associated image and the device crop code 60 for the user device are received (block 96) by a system or platform in communication with the user device 62 and capable of distributing the requested content. Based on the requested content and the device crop code 60, a query (block 98) may be performed of the storage 90 to determine if a cropped image (e.g., a cropped image depicting faces 100 in the depicted example) corresponding to the device crop code 60 and to the requested content is present.

If such a cropped image depicting faces 100 is found in storage 90 (e.g., a storage database or cache), it is returned to the user device 62 for display in conjunction with any associated content (e.g., music, articles, and so forth). In this example, the user device 62 does not perform any cropping of images, instead merely requests a piece of digital content associated with an image. The cropped image depicting faces 100 returned to the user device 62 is one that has been cropped for display on the user device 62 so as to preserve or emphasize a feature of interest, such as one or more faces.

Figure 9:
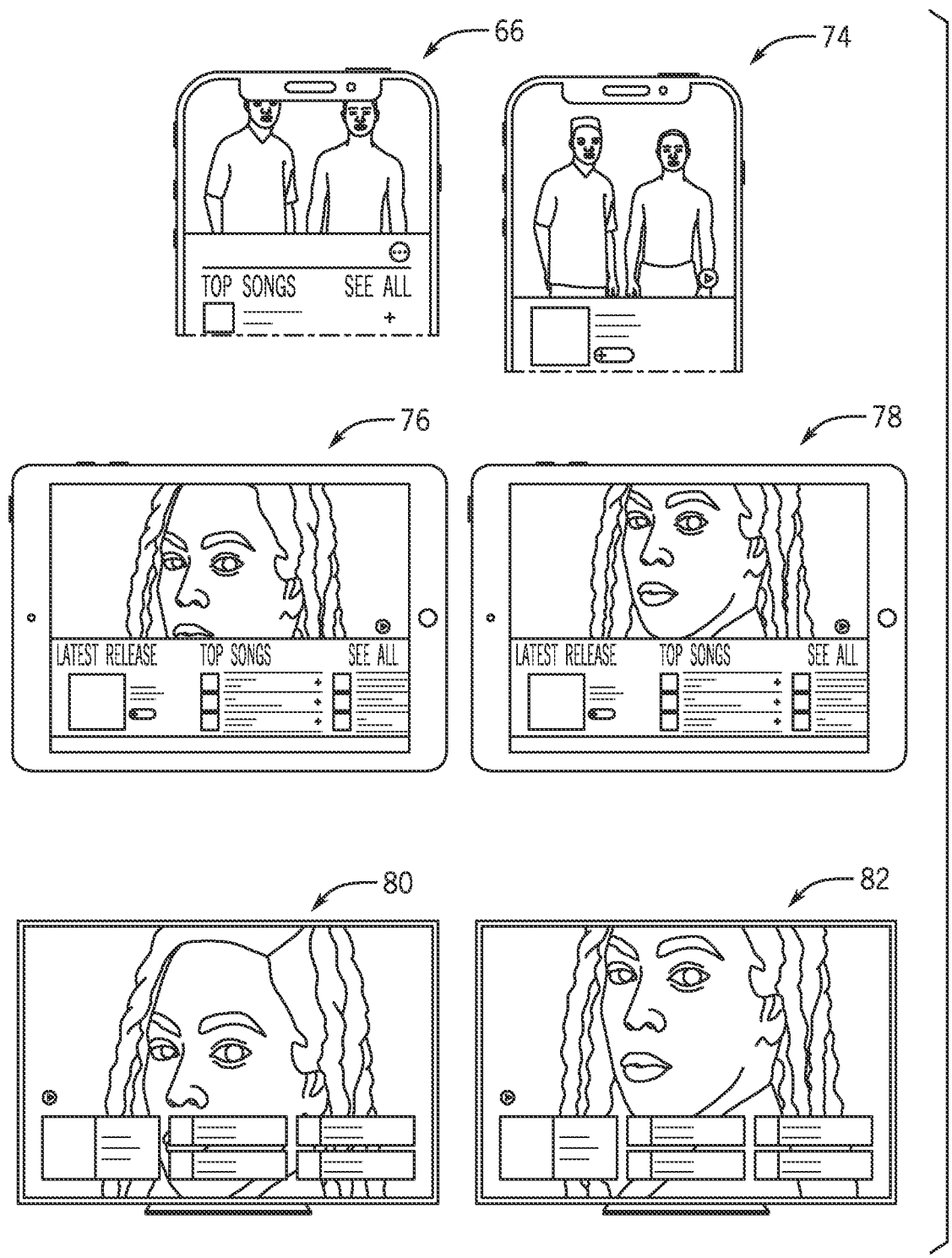
FIG. 9 is an example of uncropped and cropped images in accordance with the present approach displayed on different devices.

By way of further illustration, FIG. 9 depicts pairs of uncropped images 66, 76, 80 (left) and cropped images 74, 78, 82 (right). The uncropped images 66, 76, 80 correspond to an artist image provided for display with a respective artist page where no cropping has been performed for either facial feature preservation or for the particular display configuration of the device in question. Conversely, the cropped images 74, 78, and 82 are cropped in accordance with the present approach based on a device code for the respective display device and based on the identified facial features within the images.

As may be seen by comparing corresponding uncropped and cropped images, in the uncropped images 66, 76, and 80, no consideration is given to screen features or size, such as the notch 20 in the uppermost screen, or to the placement of the face(s) in the available display area. As a result, faces may be cut-off or positioned so as to obscure facial features in a manner inconsistent with the composition of the images.

In contrast, in the cropped images 74, 78, and 82 provided for comparison, the cropped images take into account layout of the available screen space and the facial features present in the images so as to position the images to avoid cutting off the depicted heads and to display facial features more fully, such as displaying the mouth of a depicted face in preference to a forehead. For example, as illustrated by cropped image 74, the cropping regions are based upon a shifting of the image that may be necessitated by a non-linear display edge (e.g. notch 20 of FIG. 2). Further, FIG. 9 illustrates cropped images 78 and 82, which account for an obstructed view of the image caused by graphical user interface elements that obstruct the image. As illustrated, cropped images 78 and 82 prioritize display of lips and chin of a face over a forehead, while also accounting for the chin and lips being at least partially obstructed in display of the uncropped images 76 and 82 by the graphical elements that are concurrently displayed with the images.

As noted herein, in a further aspect, particular faces may be deemed to be of interest, i.e., faces of interest. For example, faces of interest (whether alone or present in combination with other faces) may be identified for priority or emphasizing with respect to a cropped image 86. Examples of such faces of interest may include, but are not limited to, the faces of actors, musicians, athletes, politicians, and so forth. For the present discussion, such faces of interest faces may be faces known in the public context (e.g., celebrity faces) and may have various facial parameters that are known or discernible from publicly available content and images. As a result, based upon the facial identification and parameterization that occur at process block 54 of FIG. 7, an additional feature may be to compare known facial parameters for such faces of interest with those identified in a given image to allow an identified face to be characterized as a being a face of interest or not. Such a characterization may be leveraged when image cropping is performed (block 58) to prioritize identified faces of interest in the cropped image(s) 86 so as to preserve or emphasize the identified face of interest, such as with respect to other faces in the image.

Figure 10:
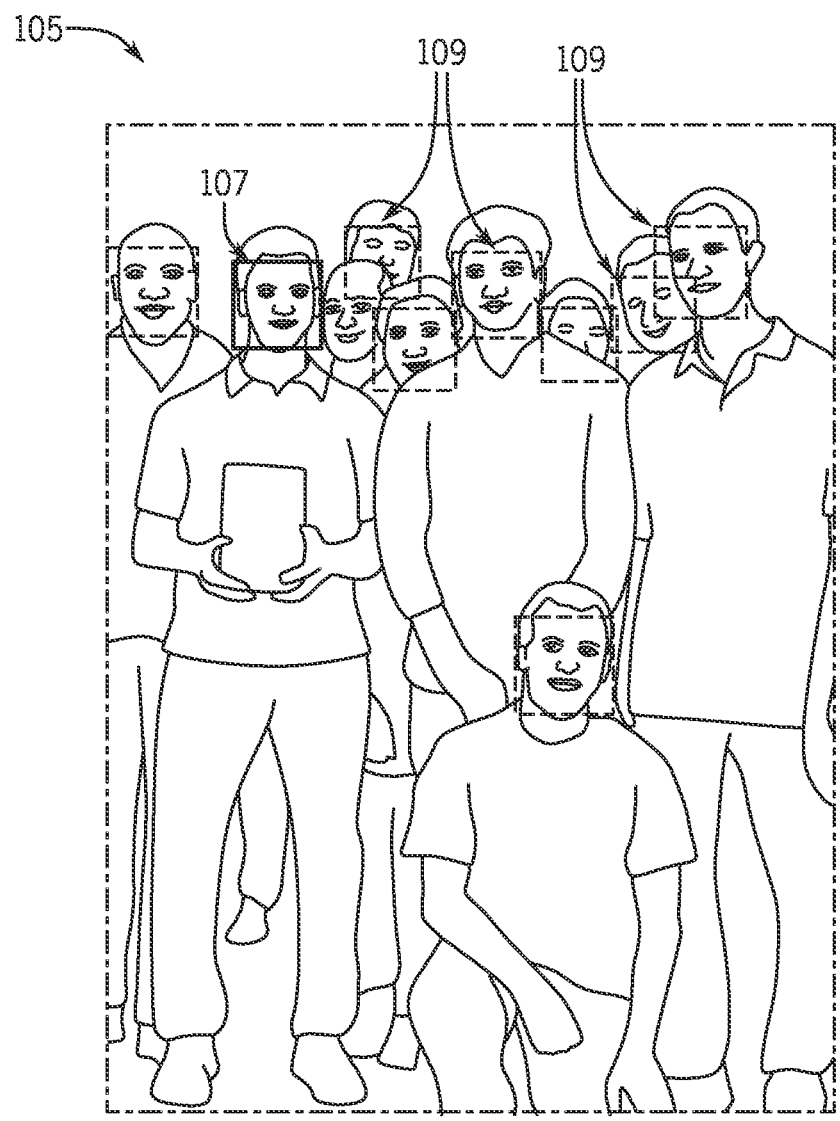
FIG. 10 is an example of an image in which faces, including a known or specific face, are recognized in an image, in accordance with an embodiment.

An example of this aspect is illustrated in FIG. 10, in which a facial recognition processed image 105 is provided in which a face of a publicly recognized figure (i.e., a face of interest 107) is shown among other faces 109. In this example, the face of interest 107 is annotated or tagged differently by the system so downstream processes can differentially handle the processing of the face of interest 107, such as in a cropping or scaling process, to preserve the face of interest 107 in cropped images 86. In some implementations, to preserve the face of interest 107, the cropped version of the image 105 may result in a reduction in the overall number of faces in the cropped image. In particular, to preserve specific facial features of the face of interest 107, such as to include the publicly recognized facial features of the face of interest 107, cropping algorithms that provide the cropped image may result in a zoomed view of the face of interest 107. Thus, other faces in the image, such as other faces 109 that are not the particular face of interest 107, may be completely or partially cropped out.

It may also be noted that, as mentioned herein, while facial features may be one type of feature within an image that one may wish to preserve or emphasize in a cropping process, other features may also benefit from the present approach. For example, some album covers or composed images may include non-facial features or details, such as names, letters, objects, etc. In implementations where non-facial features are to be preserved or emphasized in cropped images 86, the recognition routines at process block 54 may instead be configured to recognize such non-facial features of interest. By way of example, an image may include a soccer ball located on a turf and the feature of interest may be the soccer ball. In such an example, the recognition algorithms may recognize the soccer ball and may annotate the processed image 56 so as to include boundary boxes encompassing the soccer ball. Subsequent cropping processes, as discussed herein, may then utilize such boundary boxes in conjunction with device crop codes 60 so as to generate cropped images 86 that preserve or emphasize the soccer ball in this example. As may be appreciated, such processing may extend to any identifiable feature or text of interest.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A tangible, non-transitory machine-readable medium, comprising machine-readable instructions that, when executed by one or more processors, cause the one or more processors to:
receive a request from an electronic device, wherein the request is for media content associated with an image;
identify the image based upon the request;
identify a respective device crop code associated with the electronic device;
request a cropped image using an indication of the image and the respective device crop code;
receive the cropped image, wherein the cropped image comprises a version of the image that is cropped to preserve at least a portion of the image and is specifically cropped for display on the electronic device associated with the respective device crop code, wherein cropping regions of the cropped image are determined based upon:
a non-linear edge of a display of the electronic device that will display the cropped image, as indicated by a first parameter defined by the device crop code;
an obstructed display region of the display where the image will be at least partially obstructed, as indicated by a second parameter defined by the device crop code; or
a combination thereof; and
provide the cropped image to the electronic device.

2. The machine-readable medium of claim 1, wherein the cropping regions of the cropped image are determined based upon the second parameter indicating the obstructed display region of the display comprising additional content displayed on the display that will at least partially obstruct the image, wherein the additional content comprises graphical elements that will be displayed concurrently with the cropped image.

3. The machine-readable medium of claim 1, wherein the cropping regions of the cropped image are determined based upon a priority of a particular feature depicted in the image.

4. The machine-readable medium of claim 3, wherein the cropping regions of the cropped image are determined based upon a shift of the image that facilitates the priority of the particular feature depicted in the image.

5. The machine-readable medium of claim 4, wherein the shift of the image causes depiction of prioritized particular feature depicted in the image that would not be visible without with shift.

6. The machine-readable medium of claim 1, wherein cropping regions are determined based at least in part upon the crop code.

7. The machine-readable medium of claim 1, wherein the request for media content comprises one or more of a request for music content, video content, e-book content or news content having content associated with the image.

8. A method of cropping images, comprising:
receiving a request from an electronic device, wherein the request is for media content associated with an image;
identifying the image based upon the request;
identifying a respective device crop code associated with the electronic device;
requesting a cropped image using an indication of the image and the respective device crop code, wherein the cropped image comprises a version of the image that is cropped to preserve at least a portion of the image and is specifically cropped for display on the electronic device associated with the respective device crop code; wherein cropping regions of the cropped image are determined based upon:
a non-linear edge of a display of the electronic device that will display the cropped image, as indicated by a first parameter defined by the device crop code;
an obstructed display region of the display where the image will be at least partially obstructed, as indicated by a second parameter defined by the device crop code; and
providing the cropped image to the electronic device.

9. The method of claim 8, wherein the cropped image comprises a version of the image that is cropped to preserve at least a prioritized feature depicted in the image and is specifically cropped for display on the electronic device associated with a respective device crop code.

10. The method of claim 9, wherein the cropping region is based upon:
a non-linear edge of a display of the electronic device that will display the cropped image.

11. The method of claim 9, wherein the cropping region is based upon:
the second parameter indicating the obstructed display region of the display.

12. The method of claim 11, wherein the obstructed display region of the display comprises a graphical user interface comprising additional content displayed on the display that will at least partially obstruct the image comprises graphical elements that will be displayed concurrently with the cropped image.

13. The method of claim 9, wherein the cropping region of the cropped image is determined based upon a shift of the image that facilitates emphasis of the prioritized feature.

14. The method of claim 13, wherein the shift of the image causes depiction of prioritized feature that would not be visible without with shift.

15. The method of claim 8, wherein the cropping regions are determined based at least in part upon the crop code.

16. A computer for providing a cropped image to an electronic device, the computer comprising:
a memory; and
a processor, wherein the memory includes instructions executable by the processor to cause the computer to perform operations comprising:
receiving a request from the electronic device, wherein the request is for media content associated with an image;
identifying the image based upon the request;
identifying a respective device crop code associated with the electronic device;
requesting the cropped image using an indication of the image and the respective device crop code;
receiving the cropped image, wherein the cropped image comprises a version of the image that is cropped to preserve at least a portion of the image and is specifically cropped for display on electronic devices associated with the respective device crop code; wherein cropping regions of the cropped image are determined based upon:

a non-linear edge of a display of the electronic device that will display the cropped image, as indicated by a first parameter defined by the device crop code;

an obstructed display region of the display where the image will be at least partially obstructed, as indicated by a second parameter defined by the device crop code; or a combination thereof; and providing the cropped image to the electronic device.

17. The electronic device of claim 16, wherein the request for media content comprises one or more of a request for music content, video content, e-book content, or news content having the content associated with the image.

18. The electronic device of claim 17, wherein the cropping regions of the cropped image are determined based upon the second parameter indicating the obstructed display region of the display comprising additional content that will be displayed on the display that will at least partially obstruct the image, wherein the additional content comprises graphical elements that will be displayed concurrently with the cropped image.

19. The electronic device of claim 16, wherein the cropping regions of the cropped image are determined based upon the non-linear edge of the display of the electronic device that will display the cropped image, as indicated by the crop code.

20. The electronic device of claim 16, wherein the cropping regions of the cropped image are determined based upon a padding region indication associated with the crop code.

\* \* \* \* \*